US010072777B2

(12) United States Patent
Vigre (10) Patent No.: US 10,072,777 B2
(45) Date of Patent: Sep. 11, 2018

(54) SEAL ASSEMBLY FOR A HAMMER UNION, AND A METAL GASKET AND A RECEIVING PORTION FOR USE IN SAID SEAL ASSEMBLY (71) Applicant: Stamas Solutions AS, Tananger (NO)

(72) Inventor: Harald Vigre, Hafrsfjord (NO)

(73) Assignee: STAMAS SOLUTIONS AS, Tanager (NO)

( * ) Notice: Subject to any disclaimer, the term of this patent is extended or adjusted under 35 U.S.C. 154(b) by 260 days.

(21) Appl. No.: 15/101,543

(22) PCT Filed: Dec. 10, 2014

(86) PCT No.: PCT/NO2014/050230
§ 371 (c)(1),
(2) Date: Jun. 3, 2016

(87) PCT Pub. No.: WO2015/088356
PCT Pub. Date: Jun. 18, 2015

(65) Prior Publication Data
US 2016/0305587 A1 Oct. 20, 2016

(30) Foreign Application Priority Data
Dec. 11, 2013 (NO) .................................. 20131649

(51) Int. Cl.
F16L 19/025 (2006.01)
F16L 19/02 (2006.01)

(52) U.S. Cl.
CPC ......... F16L 19/0218 (2013.01); F16L 19/025 (2013.01)

(58) Field of Classification Search
CPC .......................... F16L 19/0212; F16L 19/0218
(Continued)

(56) References Cited

U.S. PATENT DOCUMENTS 1,019,572 A * 3/1912 Whipple ................. F16L 23/22
277/609
1,440,207 A * 12/1922 Burns ................... F16L 19/086
285/340
(Continued)

FOREIGN PATENT DOCUMENTS

DE 102015008858 A1 * 1/2017 .......... F16L 19/0218

OTHER PUBLICATIONS

Norwegian Search Report, Patent Application No. 20131649, dated Jun. 17, 2014.
(Continued)

Primary Examiner — David Bochna
(74) Attorney, Agent, or Firm — Andrus Intellectual Property Law, LLP

(57) ABSTRACT

A seal assembly is for a hammer union. The seal assembly comprises
a metal gasket and
a pipe comprising a receiving portion arranged to receive the metal gasket internally in the pipe.

The receiving portion and the metal gasket are shaped such that a relative rotation between the metal gasket and the pipe results in the metal gasket engaging with the receiving portion, thereby ensuring that the metal gasket is held in the receiving portion independently of the orientation of the pipe.

A receiving portion and a metal gasket for use in said seal assembly are described as well. Further, a hammer union including said seal assembly is described.

22 Claims, 11 Drawing Sheets (58) Field of Classification Search
USPC .................................................. 285/354, 39
See application file for complete search history.

(56) References Cited

U.S. PATENT DOCUMENTS

| | | | | |
|---|---|---|---|---|
| 1,519,111 A | * | 12/1924 | Brownell | ............ F16L 19/0218 277/614 |
| 1,536,785 A | | 5/1925 | Gold | |
| 1,574,052 A | * | 2/1926 | Mueller | .................. F16L 27/12 277/622 |
| 1,917,553 A | * | 7/1933 | Scholtes | ............. F16L 19/0218 277/613 |
| 3,113,792 A | | 12/1963 | Brown | |
| 4,674,775 A | * | 6/1987 | Tajima | ................ F16L 19/0206 285/330 |
| 4,919,456 A | * | 4/1990 | Wong | .................. F16L 19/0218 285/334.2 |
| 4,921,284 A | * | 5/1990 | Singeetham | ........ F16L 19/0231 285/114 |
| 5,016,920 A | * | 5/1991 | Anderson | ........... F16L 19/0286 285/334.2 |
| 5,415,374 A | | 5/1995 | Carroll et al. | |
| 5,476,244 A | | 12/1995 | Carroll et al. | |
| 5,758,910 A | | 6/1998 | Barber et al. | |
| 6,945,569 B1 | | 9/2005 | Diaz et al. | |
| 7,549,679 B2 | * | 6/2009 | Brosius | ................. F16L 19/086 285/248 |
| 2004/0021319 A1 | | 2/2004 | Richardson et al. | |
| 2004/0089455 A1 | | 5/2004 | Richardson | |
| 2010/0117359 A1 | | 5/2010 | Herndon | |
| 2012/0007358 A1 | | 1/2012 | MacKey et al. | |

OTHER PUBLICATIONS

International Search Report, PCT/NO2014/050230, dated Mar. 31, 2015.
PCT Written Opinion, PCT/NO2014/050230, dated Oct. 29, 2015.
PCT Written Opinion, PCT/NO2014/050230, dated Mar. 31, 2015.
International Preliminary Report on Patentability, PCT/NO2014/050230, date of completion Aug. 13, 2016.

* cited by examiner

III-III

SEAL ASSEMBLY FOR A HAMMER UNION, AND A METAL GASKET AND A RECEIVING PORTION FOR USE IN SAID SEAL ASSEMBLY

CROSS-REFERENCE TO RELATED APPLICATIONS

This application is the U.S. national stage application of International Application PCT/NO2014/050230, filed Dec. 10, 2014, which international application was published on Jun. 18, 2015, as International Publication WO 2015/088356 in the English language. The international application is incorporated herein by reference, in entirety. The international application claims priority to Norwegian Patent Application No. 20131649, filed Dec. 11, 2013, which is incorporated herein by reference, in entirety.

FIELD

The invention relates to a seal assembly for a hammer union, and a metal gasket and a pipe comprising a receiving portion for use in said seal assembly. More particularly, the invention relates to a seal assembly comprising a metal gasket and a pipe comprising a receiving portion arranged to receive the metal gasket internally in the receiving portion.

BACKGROUND

In its position of application, the metal gasket will be between a sealing surface of the receiving portion of the pipe and a sealing surface of an end portion of a further pipe.

When so-called hammer unions (also called: wing unions, hammer lugs, Weco unions) are used as fireproof unions, metal gaskets must be used. Gaskets made entirely or partly from rubber or a synthetic material are not usable because of their relatively poor temperature resistance.

Metal gaskets are used in connections in blowout preventers (BOPs) and must resist both fire and high pressures. The metal gaskets that are used in blowout preventers today are used under dispensation because they do not satisfy the safety requirements that apply.

As is known, metal gaskets are relatively rigid and it is a problem, especially when the hammer union is mounted vertically, that the gasket falls out of the union before the opposite union part, the end portion of the further pipe, that is, has been mounted.

Hammer unions are a relatively old product that is available with gaskets in a number of designs and materials. However, none of the known designs solves the problem in question.

SUMMARY

The invention has for its object to remedy or reduce at least one of the drawbacks of the prior art.

The object is achieved, according to the invention, through the features that are specified in the description below and in the claims that follow.

The invention is defined by the independent claims. The dependent claims define advantageous embodiments of the invention.

In a first aspect, the invention relates more specifically to a seal assembly for a hammer union, the seal assembly comprising:

a metal gasket; and
a pipe comprising a receiving portion arranged to receive the metal gasket internally in the pipe;
the receiving portion and the metal gasket being shaped such that a relative rotation between the metal gasket and the pipe results in the metal gasket engaging with the receiving portion, thereby ensuring that the metal gasket is held in the receiving portion independently of the orientation of the pipe.

By a seal assembly is meant an assembly of several components for use in a hammer union to make a joint or connection tight between two pipes or union parts. The seal assembly comprises a metal gasket which will be described in further detail in what follows. One of the two pipes that are to be connected to each other comprises an end portion, which, in what follows, will be termed a receiving portion because it is arranged to receive the metal gasket. The receiving portion may thus be understood to belong to the pipe that is connected to the metal gasket. The metal gasket and the receiving portion are formed in such a way that when the metal gasket is inserted into the receiving portion, rotation of the metal gasket relative to the receiving portion will result in the metal gasket engaging with the receiving portion and thus becoming stuck in a releasable way in the receiving portion.

With the metal gasket attached to the receiving portion, the metal gasket will be prevented from falling out of the receiving portion independently of how the pipe and thereby the receiving portion are moved and turned. The metal gasket thus will not fall out even if the receiving portion is in a vertical position with the metal gasket facing downwards. In addition, the metal gasket will keep its orientation relative to the receiving portion of the pipe even when a further pipe is brought together with the receiving portion of the pipe and connected to it by means of the hammer union. The invention therefore provides a reliable and secure seal.

The seal assembly according to the invention thus provides a solution to the above-mentioned problem.

In one embodiment, the metal gasket may comprise a flange projecting radially outwards. All or parts of the flange, which may also be termed a rim or a bulb because of its effect, may be the portion of the metal gasket that engages with a portion of the receiving portion for the attachment of the metal gasket to the pipe.

Further, the flange may be positioned between a first sloping sealing surface and a second sloping sealing surface of the metal gasket. As there is one sealing surface on either side of the flange, it will consequently not be the flange itself that is being sealed against. The flange may thereby be formed in various ways, some possible ones of which will be described in what follows. The first sloping sealing surface will seal against a sealing surface internally in the receiving portion of the pipe, and the second sloping sealing surface will seal against a sealing surface in a further pipe. It is practical to form the sealing surfaces of the metal gasket to correspond to sealing surfaces at the end portions of the two pipes that are to be connected to each other in the hammer union, but the sealing surfaces do not have to have the same slope. The function of the metal gasket in the seal assembly, and thereby in the hammer union, will be described further in what follows.

The flange may have a non-circular shape, which constitutes one possible embodiment of the metal gasket of the seal assembly. It will be natural to think of a circular shape of the flange as a pipe is usually circular inside, but since the flange projects outside the sloping sealing surfaces, which are circular, therefore is sealing over the entire internal circumference of the pipe, it is not necessary for the flange to be circular. Rather, it is an advantage for it not to be circular, as a non-circular shape gives the possibility of forming the flange in such a way that it may complementarily fit a portion of the receiving portion of the pipe for its attachment therein.

The flange may have an outer circumferential surface comprising a first peripheral portion and a second peripheral portion. Further, a smallest radius of the first peripheral portion may be smaller than a largest radius of the second peripheral portion.

These alternatives are further specifications of the non-circular shape mentioned above.

In one embodiment, the first peripheral portion may comprise a recess in the flange. And in another embodiment, the first peripheral portion may comprise three recesses in the flange. An effect of the recess or recesses in the flange is that they allow the metal gasket, as it is being inserted into the receiving portion of the pipe, to be moved past corresponding elements projecting inwards in the pipe from the internal surface of the pipe, for example knobs, lips or equivalent elements. When the metal gasket is rotated relative to the pipe, the recesses will thus be displaced relative to the inward-projecting elements in the pipe, and thereby the metal gasket may not fall out again.

Instead of, or in addition to, the above-mentioned solution, the second peripheral portion may comprise a protrusion in the flange. It is evident that more, for example three, protrusions may be provided in the second peripheral portion of the flange.

The flange may be oval, which constitutes a possible embodiment of the metal gasket of the seal assembly.

In one embodiment, the metal gasket may be completely housed internally in the receiving portion for the metal gasket to be protected from blows against the receiving portion. By placing the metal gasket well recessed in the receiving portion, so that no part of the metal gasket projects from the receiving portion, the metal gasket will not be damaged either, if, for example, the pipe falls onto the ground.

In one embodiment, the receiving portion of the pipe may comprise a mouth portion and an inner sloping sealing surface for cooperation with the first sloping sealing surface of the metal gasket. By a mouth portion is meant, here, the portion of the receiving portion of the pipe that lies the nearest to the opening, the portion in which the metal gasket is inserted from outside the pipe to the receiving portion of the pipe, that is. The inner sloping sealing surface of the receiving portion is a sealing surface that is inside the pipe and that is formed to abut against at least a portion of the first sloping sealing surface of the metal gasket. The first sloping sealing surface of the metal gasket and the inner sloping sealing surface of the receiving surface do not have to have the same slope. It may rather be an advantage for the effectiveness of the seal if the slopes of the sealing surfaces are not the same.

The receiving portion may further comprise a circular recess to receive the flange of the metal gasket between the mouth portion and the inner sloping sealing surface of the receiving portion. The circular recess may comprise a recess in the entire internal circumference of the pipe, that is. The recess has the function of housing the flange of the metal gasket, independently of the design of the flange, when the metal gasket is connected to the receiving portion. The metal gasket may preferably move in the recess, have a loose fit, that is, so as to come into tight contact with sealing surfaces on both sides in the best possible way, when the seal assembly is being connected to another pipe to constitute a connection between two pipes. A loosely attached metal gasket may thus provide the best seal.

Between the mouth portion and the circular recess, a lip projecting inwards in the receiving portion may be provided. It is conceivable that when the groove or recess that is to house the flange is formed, it will be appropriate to ensure that a thin edge, or lip, projecting inwards in the pipe, is left between the mouth portion and the circular recess. Of course, such a lip may also be formed without it being in connection with the forming of the recess. The lip may function as a stop, or barb, which is arranged to let the flange of the metal gasket get in to the circular recess, but prevent it from falling out again. It must be understood that the metal gasket will still be removable, if that is desirable, but it may not unintendedly move past the inward-projecting lip.

The inward-projecting lip may be formed in such a way that, in at least one position, the flange of the metal gasket can be moved past the lip. As the metal gasket is inserted into the receiving part, it may thus be rotated to the point, or the position, in which the metal gasket and the lip are of such shapes relative to each other that the metal gasket may pass. By further rotation, the metal gasket is prevented from falling out again past the lip. This means that where the flange of the metal gasket is formed with a recess, for example, the lip will comprise a corresponding protrusion, or vice versa. If there are more recesses in the flange of the metal gasket, the lip must also comprise more protrusions.

The receiving portion has an inner diameter and the metal gasket has an inner diameter, wherein the inner diameter of the receiving portion may be the same as the inner diameter of the metal gasket. The advantage of having a straight bore in the metal gasket and receiving portion is that turbulence is avoided in the region of the connection. In those cases in which the inner diameter of the pipe, the inner diameter of the receiving portion, that is, is different from the inner diameter of the metal gasket, turbulence, and thus a washing-out of metal, may result when fluid is flowing through the pipe and the connection.

The receiving portion may be one of a male part or a female part. It is the most practical for the receiving portion to be a female part which first receives the metal gasket and then receives another pipe, whose end portion is a male part. However, it is also conceivable that the metal gasket is received in the male part which is then received in a female part.

The seal assembly may further comprise a second pipe, which is one possible embodiment of the seal assembly.

The second pipe may comprise an end portion for cooperation with the receiving portion of the pipe.

The end portion may comprise an internal sealing surface for cooperation with the second sloping sealing surface of the metal gasket. When the first sloping sealing surface of the metal gasket is sealing against the inner sealing surface of the receiving portion and the second sloping sealing surface of the metal gasket is sealing against the internal sealing surface of the end portion, the union is tight.

The receiving portion may further comprise an outer sloping sealing surface. This outer sloping sealing surface is in the mouth portion, usually in the very opening of the pipe. Further, the end portion may comprise an external sloping sealing surface for cooperation with the outer sloping sealing surface of the receiving portion.

It is common in a hammer union or other connection between pipes that the two pipe ends that are to be connected to each other have external end surfaces that are perpendicular to the longitudinal axis of the pipes and that abut on each other. If instead, or in addition, the receiving portion has an outer sloping sealing surface, the connection will be both stronger and tighter.

In a second aspect, the invention relates to a receiving portion for use in a seal assembly according to a first aspect of the invention.

In a third aspect, the invention relates to a metal gasket for use in a seal assembly according to a first aspect of the invention.

In a fourth aspect, the invention relates to a hammer union which comprises the seal assembly according to a first aspect of the invention.

The hammer union may further comprise a hammer nut.

A metal gasket for a hammer union is described as well, the metal gasket, in the position of application, being between the sealing surface of the first union part, above termed the inner sealing surface of the receiving portion, and the sealing surface of a second union part, above termed the internal sealing surface of the end portion, and the metal gasket being characterized by being provided with at least one first locking portion which, on rotation of the metal gasket around its own longitudinal axis, is arranged to engage with a complementarily fitting second locking portion of one of the union parts.

An attachment of this kind, resembling a bayonet mount, is simple in use and ensures that, during the assembly work, the gasket will not unintendedly fall out of the union part where it is positioned, namely in the receiving portion.

The first locking portion may consist of a divided bulb, possibly termed a brim or flange, projecting radially from the outside of the gasket. The bulb may have any practical shape with a rectangular, trapezoidal or semicircular cross section, for example.

The bulb may extend over a sector of the circumference of the metal gasket. Normally, the bulb is divided to enable it to be moved into the second locking portion which typically has the form of several grooves or recesses in one of the union parts, the grooves possibly being distributed around the longitudinal axis.

The external radius of the bulb may be non-uniform. This means that, along the circumference of the metal gasket, it may vary from the external radius of the metal gasket to its largest radius. The bulb may thereby have an oval shape.

Hammer unions of this kind are often formed with a female part and a male part. The first union part may be a female part and the second union part may be a male part.

It is common to arrange the metal gasket in the female part. The metal gasket may be connected to the first union part.

If desirable, the first locking portion may very well be in the first union part or in the second union part, and the second locking portion in the metal gasket.

By a metal gasket is meant a gasket that is manufactured from a suitable metal, for example from bronze, brass, cast iron or steel. Combinations of these and other metals may be appropriate in some cases.

Hammer unions with metal gaskets may thereby be fitted just as easily as hammer unions with gaskets formed from a rubber material or a synthetic material.

BRIEF DESCRIPTION OF THE DRAWINGS

In what follows, examples of preferred embodiments are described, which are visualized in the accompanying drawings, in which:

FIG. 18b shows the section II-II of FIG. 18a;

FIG. 19a shows a perspective view of a pipe with a receiving portion;

FIG. 19b shows an end view of the pipe of FIG. 19a;

FIG. 19c shows the section III-III of FIG. 19b;

FIG. 20a shows a perspective view of a pipe with an end portion;

FIG. 20b shows an end view of the pipe of FIG. 20a;

FIG. 20c shows the section IV-IV of FIG. 20b;

FIG. 21b shows an end view of the pipe of FIG. 21a;

DETAILED DESCRIPTION OF THE DRAWINGS

Like or corresponding elements are indicated by the same reference numeral in the figures.

Indications of position or orientation, such as upper, lower, over, under, vertical and horizontal refer to the positions that are shown in the figures.

The figures are meant to illustrate the construction and operation of the invention. A person skilled in the art will understand that the relative size ratio of the individual elements may be somewhat distorted. The figures are on different scales. For the sake of exposition, the reference numerals are not all shown in all the figures.

Figure 1:
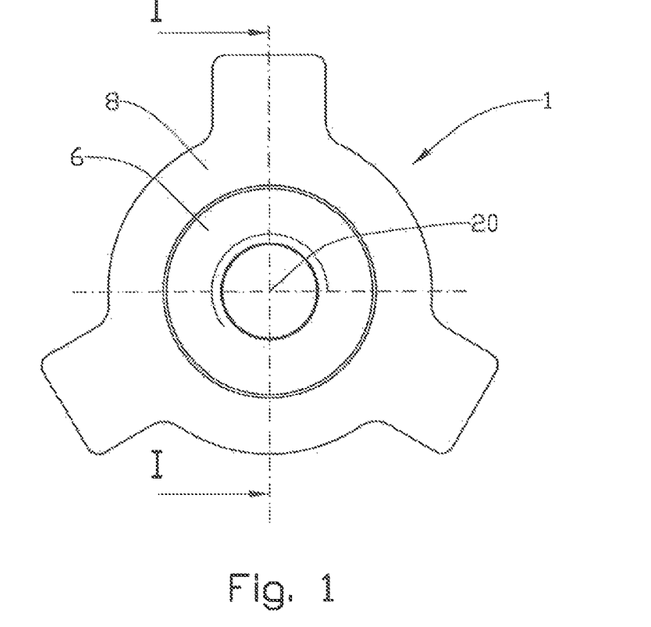
FIG. 1 shows an end view of a hammer union arranged with a metal gasket according to the invention.

Reference is first made to FIG. 1 which shows an end view of a hammer union 1. The figure shows a hammer nut 8 placed around a union part 6 or a pipe 6, the pipe 6 constituting the second one of two pipes, or union parts, that are joined together by means of the hammer union 1. In the figure, a sectional plane I-I through the hammer union 1 is indicated, the sectional plane extending along a longitudinal axis 20 that coincides with the longitudinal axis of the pipes.

Figure 2:
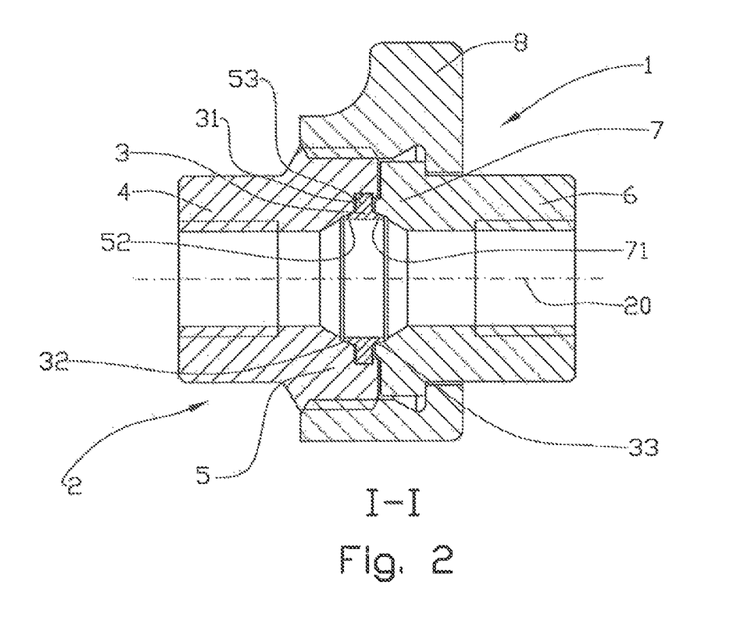
FIG. 2 shows a section I-I of FIG. 1.

In FIG. 2, the section I-I of FIG. 1 is shown. The figure shows that the hammer union 1 is provided with a seal assembly 2 comprising a metal gasket 3. The hammer union 1 comprises, as is known per se, a first union part 4, or a pipe 4, a second union part 6, or a second pipe 6, and a hammer nut 8. The pipe 4 has an end portion 5, in which the metal gasket 3 is received. In what follows, said end portion 5 will be termed a receiving portion 5 in order thus to distinguish it from a second end portion 7 of the second pipe 6.

In one embodiment of the seal assembly 2, the metal gasket 3, in its position of application, as is shown in FIG. 2, is between the first pipe 4 and the second pipe 6. The metal gasket 3 rests sealingly against an inner sloping sealing surface 52 of the receiving portion 5 of the first pipe 4 and an internal sloping sealing surface 71 of the end portion 7 of the second pipe 6.

The metal gasket 3 and the receiving portion 5 are formed in such a way that when the metal gasket 3 is rotated relative to the receiving portion 5, the metal gasket 3 will engage with, and be attached to, the receiving portion 5 in a releasable manner. In the exemplary embodiment of FIG. 2, engagement between the metal gasket 3 and the receiving portion 5 is provided by the metal gasket 3 being provided with a first locking portion 31, or engagement portion 31, shown here in the form of a flange 31 that fits in a second locking portion 53, or an engagement portion 53 shown here in the form of a groove 53, or a recess 53 in the receiving portion 5 of the first pipe 4.

In FIG. 2, it is further shown that the flange 31 of the metal gasket 3 is defined between a first sloping sealing surface 32 and a second sloping sealing surface 33.

Figures 3, 4, 5:
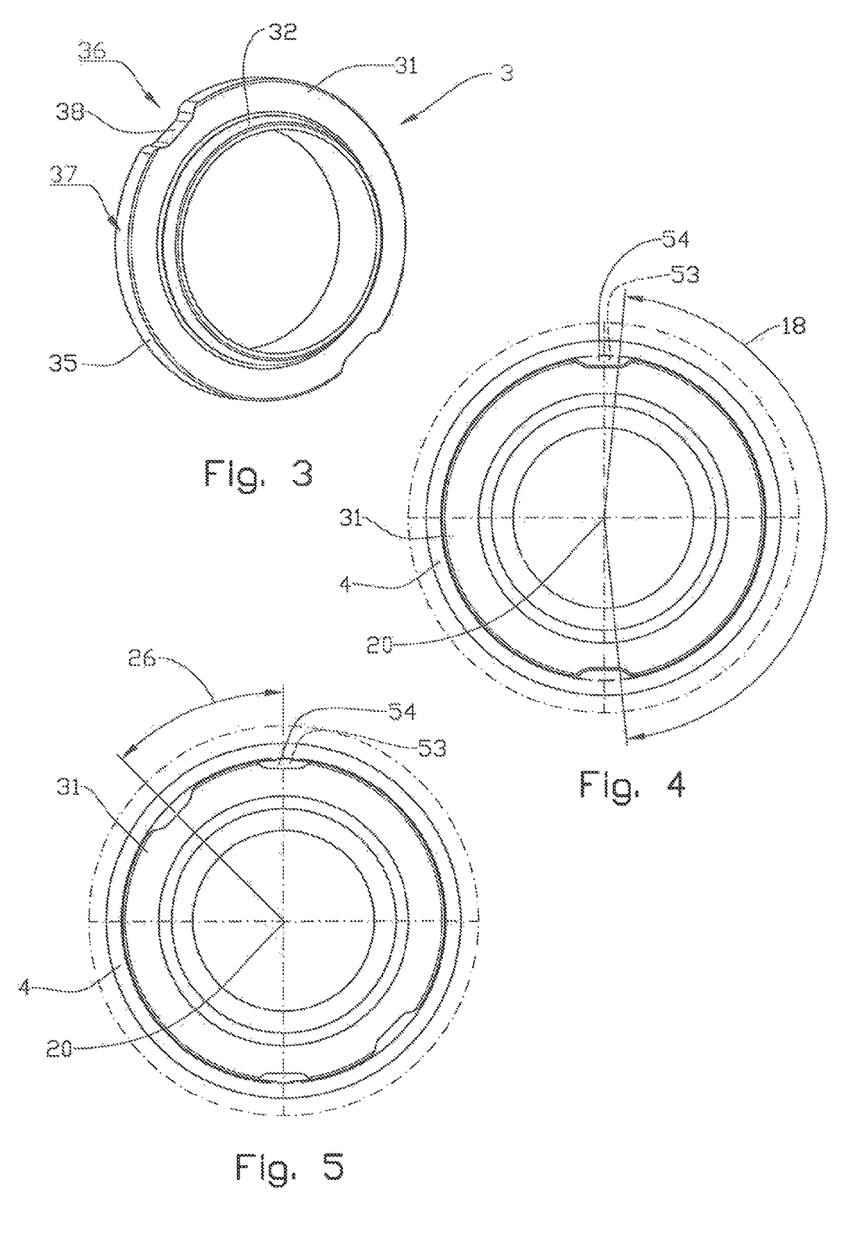
FIG. 3 shows a metal gasket according to the invention in perspective and on a larger scale.
FIG. 4 shows the metal gasket of FIG. 3 before attachment to a receiving portion in a pipe, only a section of the receiving portion being shown.
FIG. 5 shows the metal gasket after attachment to the receiving portion.

FIG. 3 shows an example of a metal gasket 3 for use in the seal assembly 2. The metal gasket 3 comprises an outer circumferential surface 35 which may practically be divided into a first peripheral portion 36 and a second peripheral portion 37, wherein it must be understood that the first peripheral portion 36 may comprise more than one portion 36, and the second peripheral portion 37 may comprise more than one portion 37. Each peripheral portion 36, 37 has an extent over a sector 18, see FIG. 4, relative to the longitudinal axis 20. The metal gasket 3 of FIG. 3 is provided with recesses 38 in its first peripheral portion 36.

When being fitted, the metal gasket 3 may be pushed into the receiving portion 5 as is shown in FIG. 4, after which the metal gasket 3 is rotated over an angle 26 into engagement with or attachment to the receiving portion 5 as is shown in FIG. 5. In the example shown, the receiving portion 5 is further provided with an inward-projecting lip 54 which is between the mouth portion 51 (see FIG. 2) and the recess 53 which is shown as a circular recess 53 here. The lip 54 is formed in such a way that it corresponds to the flange 31 of the metal gasket 3, so that, in this example, as the metal gasket 3 is moved into the receiving portion 5, the recesses 38 of the flange 31 may pass the lip 54. When the metal gasket 3 is rotated, the lip 54 will thereby function as a stop or barrier that will prevent the metal gasket 3 from falling out again from the receiving portion 5 unless the metal gasket 3 is rotated back into exactly the same position. In FIG. 5, the flange 31 is in engagement with the receiving portion 5 by the flange 31 being housed in the circular recess 53, and secured there by means of the lip 54.

Figures 6, 7, 8:
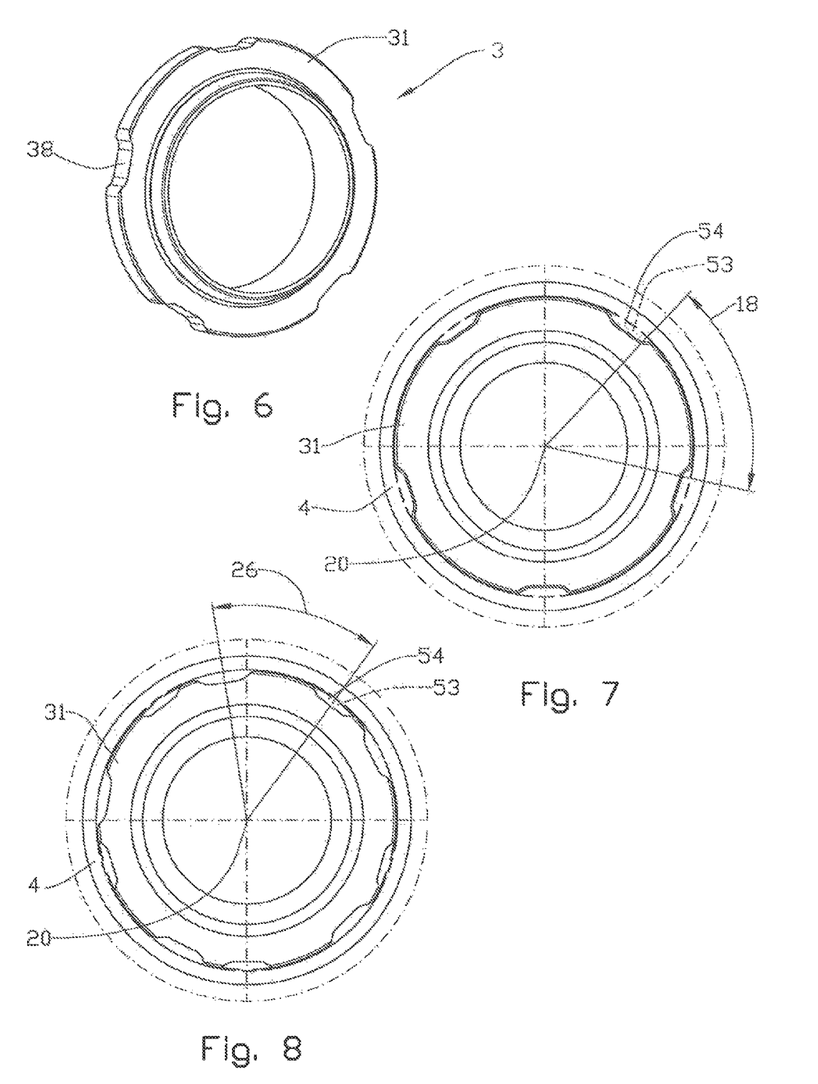
FIG. 6 shows a metal gasket according to the invention in another embodiment in perspective.
FIG. 7 shows the metal gasket of FIG. 6 before attachment to the receiving portion, only a section of the receiving portion being shown.
FIG. 8 shows the metal gasket of FIG. 6 after attachment to the receiving portion.

FIG. 6 shows the metal gasket 3 in an alternative embodiment in which the flange 31 is divided into several sectors 18, with five recesses 38 in the flange 31. It must be understood that the inward-projecting lip 54 then has at least two portions corresponding to at least two of the five recesses 38 and then functioning as barbs or barriers when the metal gasket 3 is rotated, in order to prevent the metal gasket from falling out again, as is shown in FIGS. 7 and 8.

Figures 9, 10, 11:
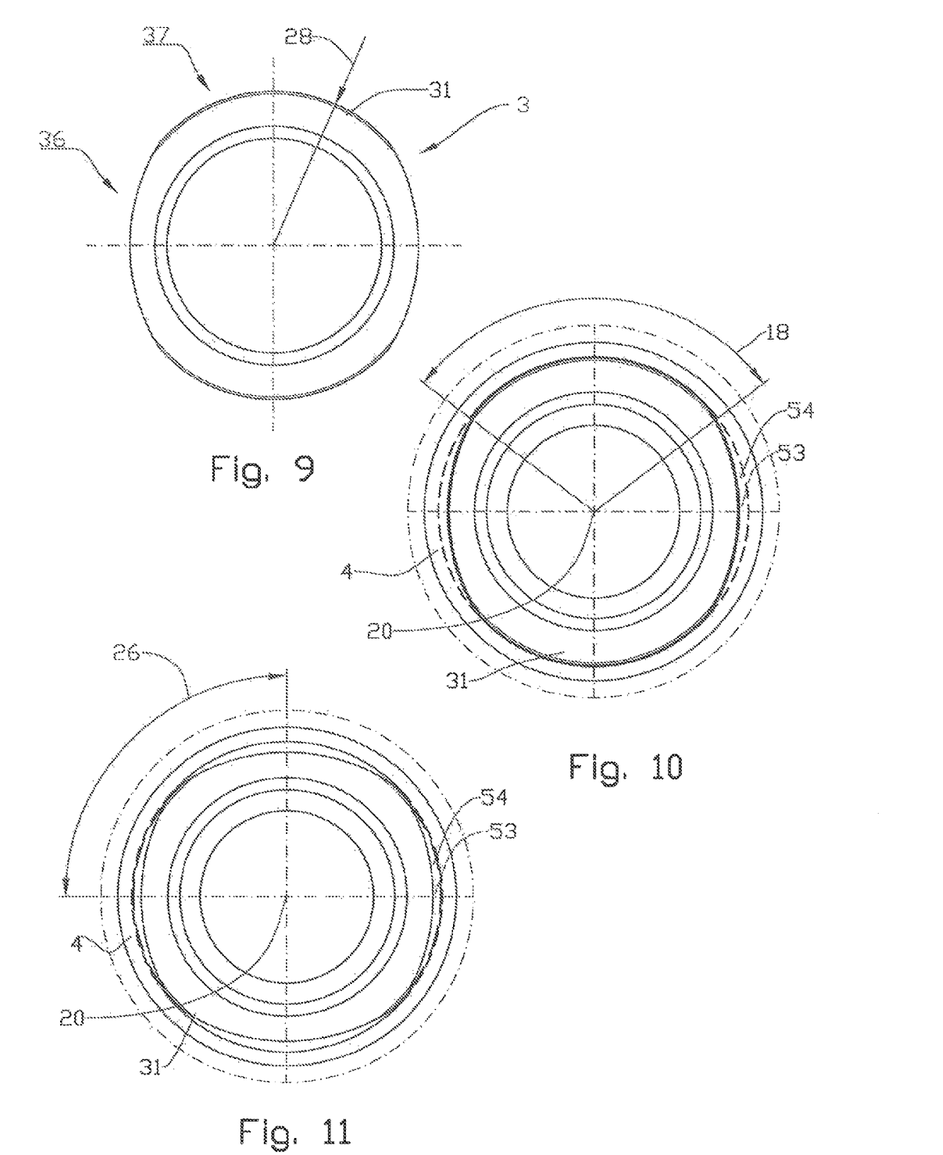
FIG. 9 shows a metal gasket according to the invention in a further embodiment.
FIG. 10 shows the metal gasket of FIG. 9 before attachment to the receiving portion, only a section of the receiving portion being shown.
FIG. 11 shows the metal gasket of FIG. 9 after attachment to the receiving portion.

In FIG. 9, the metal gasket 3 is formed with an oval flange 31, in which the radius 28 of the flange is non-uniform, the first peripheral portion 36 and the second peripheral portion 37 have different radii, that is. As shown in FIGS. 10 and 11, the operation of the metal gasket 3 is the same as that described above, as the shape of the inward-projecting lip 54 is of such a design that it corresponds to the oval shape of the flange 31.

Figures 12, 13, 14:
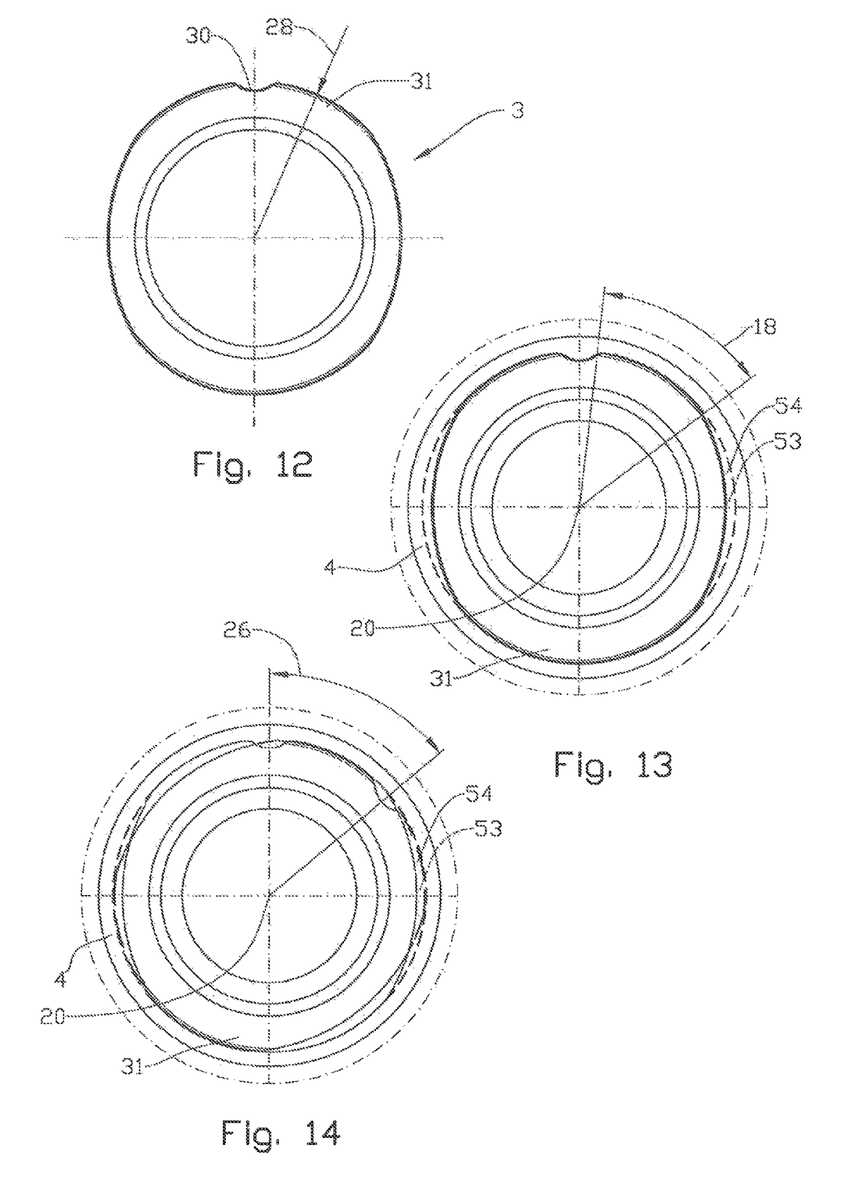
FIG. 12 shows a metal gasket according to the invention in yet another embodiment.
FIG. 13 shows the metal gasket of FIG. 12 before attachment to the receiving portion, only a section of the receiving portion being shown.
FIG. 14 shows the metal gasket of FIG. 12 after attachment to the receiving portion.

The metal gasket 3 in the embodiment shown in FIGS. 12-14 has been given an orienting groove 30 to ensure that the metal gasket 3 is fitted in the desired position. In the exemplary embodiments described earlier, the same can be achieved, for example, by shaping at least one of the recesses 38 and the corresponding portion of the lip 54 differently from the rest.

Figure 15:
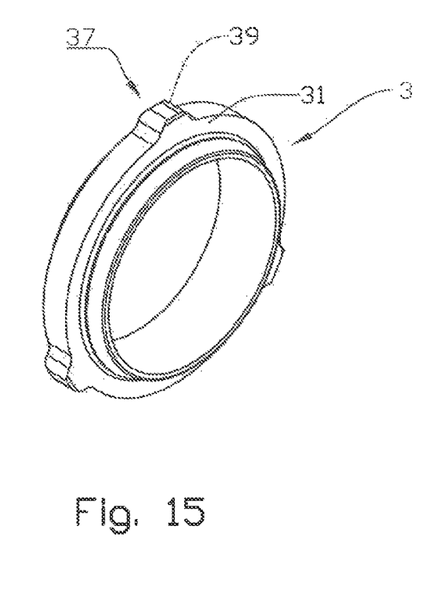
FIG. 15 shows an example of a metal gasket with three protrusions in the flange.

FIG. 15 shows a metal gasket 3 in which the second peripheral portion 37 comprises protrusions 39. In this example, the metal gasket 3 comprises three protrusions 39. A metal gasket 3 with protrusions 39 will function in the same way as a metal gasket 3 with recesses 38, as the lip 54 in the receiving portion 5 is formed in such a way that it will correspond to the metal gasket 3. It must be understood that three protrusions 39 are just an example and that other numbers of protrusions 39 or even protrusions 39 in combination with recesses 38, will be possible embodiments.

Figure 16:
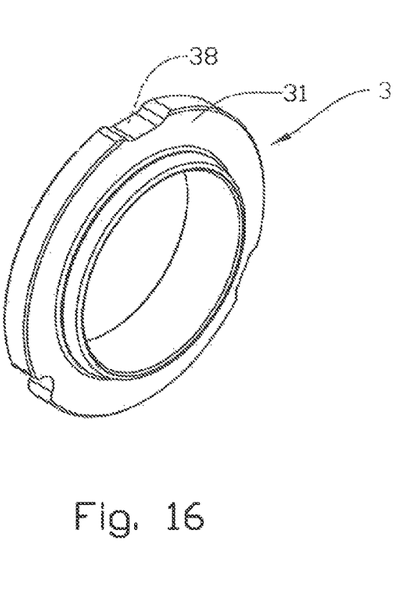
FIG. 16 shows an example of a metal gasket with three recesses in the flange.

FIG. 16 shows a metal gasket 3 in a preferred embodiment, with three recesses 38, two of the recesses 38 being identical and different from the third recess 38.

Figure 17:
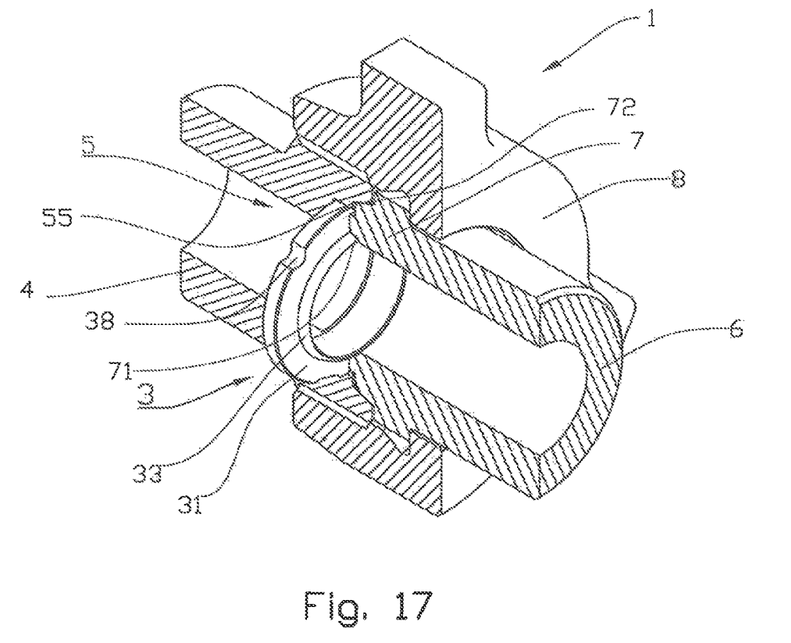
FIG. 17 shows a partially cutaway perspective view of a seal assembly.

In FIG. 17, which is a partially cutaway hammer union 1 with the seal assembly 2, it is clear how the seal assembly 2 consisting of the pipe 4 and metal gasket 3 has been brought together with the second pipe 6 and then fitted with a hammer nut 8. What is also shown in FIG. 17, is that the receiving portion 5 has an outer sloping sealing surface 55 which seals against a corresponding external sloping sealing surface 72 at the end portion 7 of the second pipe 6. The second sloping sealing surface 33 of the metal gasket 3 seals against the internal sloping sealing surface 71 of the end portion 7 in addition to, as earlier mentioned, the first sloping sealing surface 32 sealing against the inner sloping sealing surface 52 (see FIGS. 2 and 18b). In this way, a dual seal is provided, that is the pipes 4, 6 against the metal gasket and the receiving portion 5 against the end portion 7.

Figure 18A:
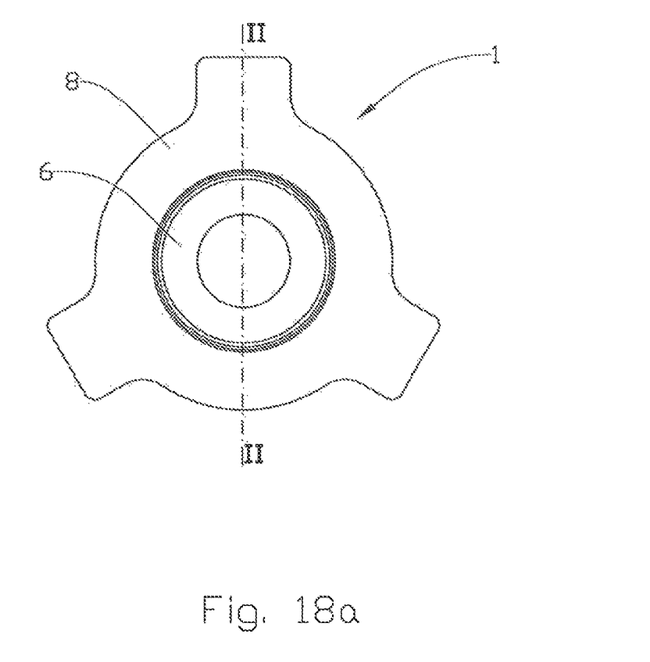
FIG. 18a shows an end view of a hammer union provided with a seal assembly.
Figure 18B:
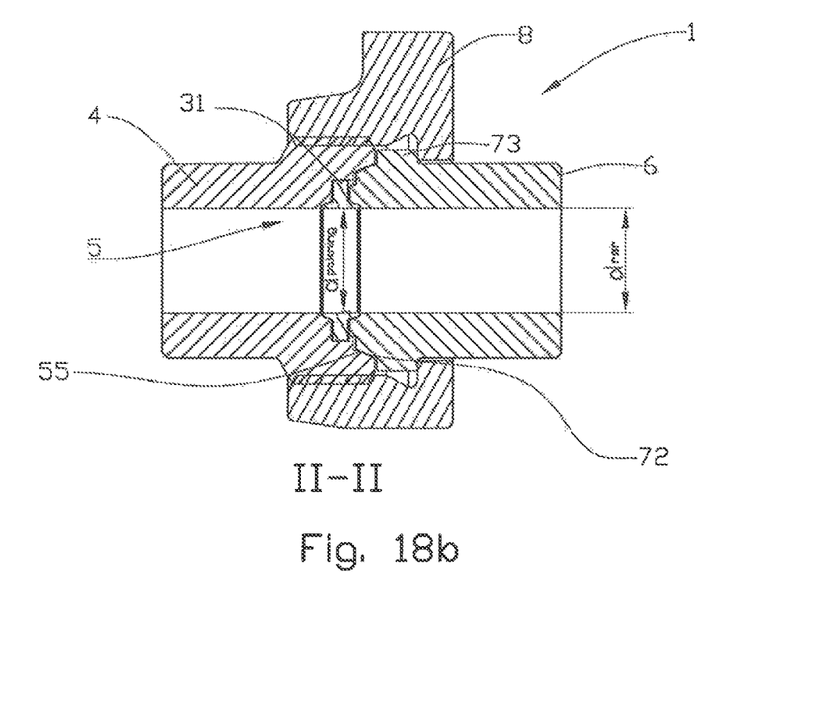

FIGS. 18a and 18b show a hammer union 1 which is provided with a seal assembly 2, FIG. 18a showing an end view of said hammer union 1 in which the section II-II is indicated. FIG. 18b shows the section II-II. Here, the pipe 4 with the receiving portion 5 is shown connected to the metal gasket 3, the end portion 7 of the second pipe 6 and a hammer nut 8. This embodiment of the seal assembly 2 is particularly suitable because the inner diameter d of the pipes 4, 6 is the same as the inner diameter $d_g$ of the metal gasket 3. A straight bore through the union 1 is then achieved, so that turbulence that may result in metal being washed out into the fluid flow through the pipes 4, 6 is prevented.

Further, FIG. 18b shows a seal assembly 2 in which the metal gasket 3 is completely housed internally in the receiving portion 5. In that way, the metal gasket 3 will be protected from blows against the receiving portion 5.

Figures 19A, 19B, 19C:
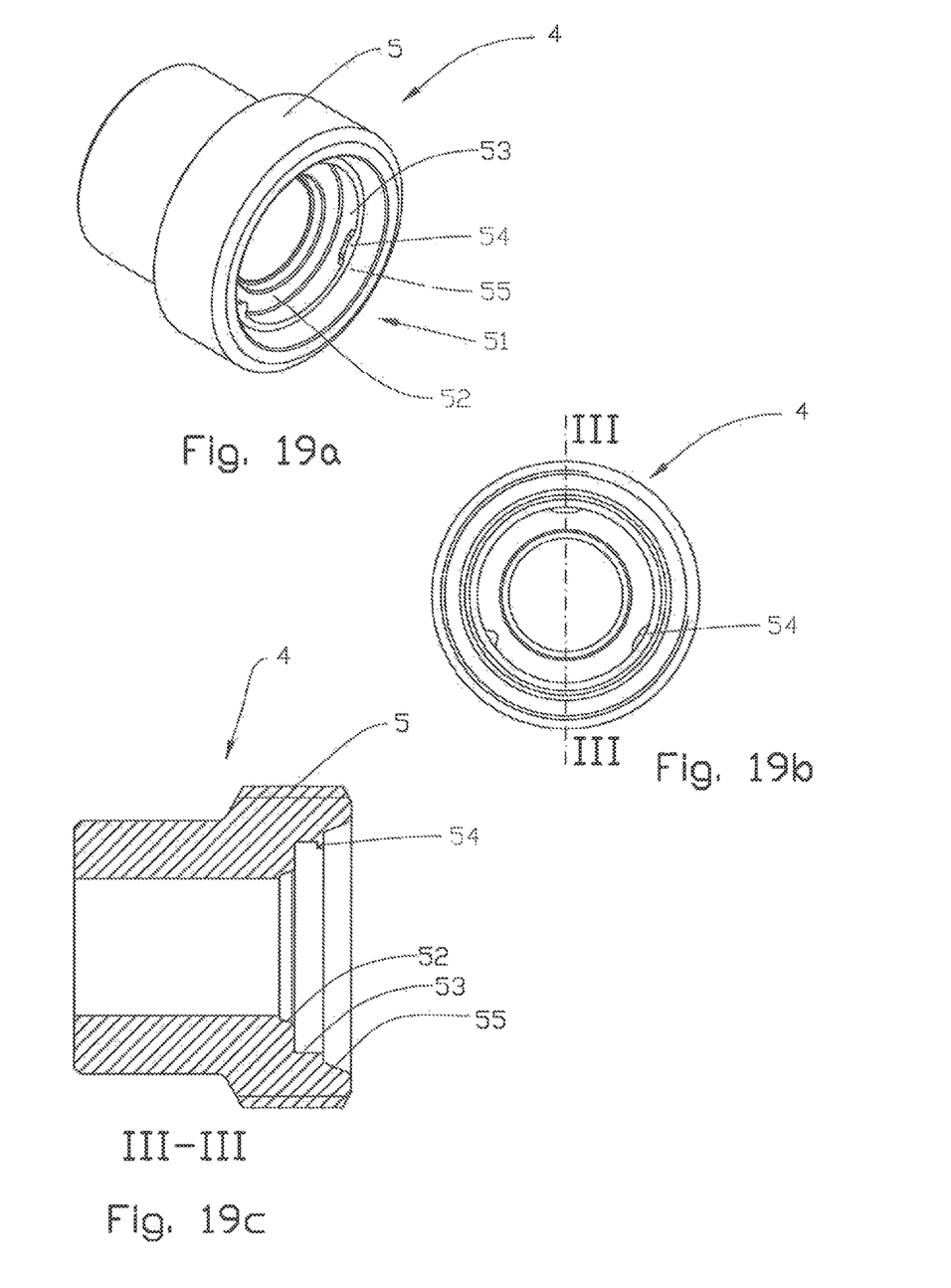

FIGS. 19a, 19b and 9c show a pipe 4 with a receiving portion 5 seen in perspective, in an end view and in the section III-III, respectively. The receiving portion 5 in the embodiment shown shows the inner sloping sealing surface 52, the circular recess 53, the inward-projecting lip 54 which is shown here in a design corresponding to that of a metal gasket, not shown, with three recesses, one of which is different from the two others, and the outer sloping sealing surface 55.

Figures 20A, 20B, 20C:
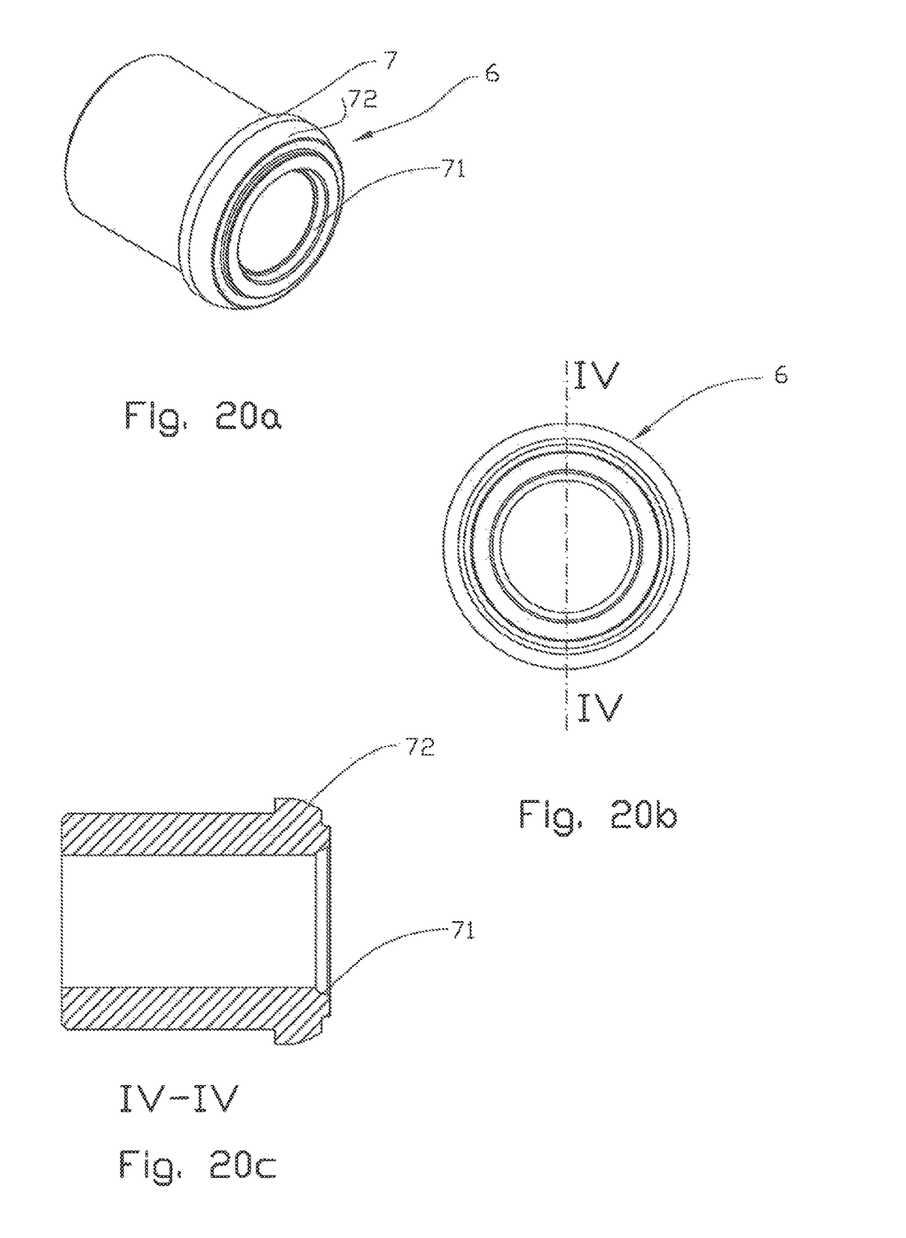

FIGS. 20a, 20b and 20c show a pipe 6 with an end portion 7 seen in perspective, in an end view and in the section IV-IV, respectively. The end portion 7 in the embodiment shown shows the internal sloping sealing surface 71 for sealing against a metal gasket not shown and the external sloping sealing surface 72 for sealing against a receiving portion not shown.

Figure 21A:
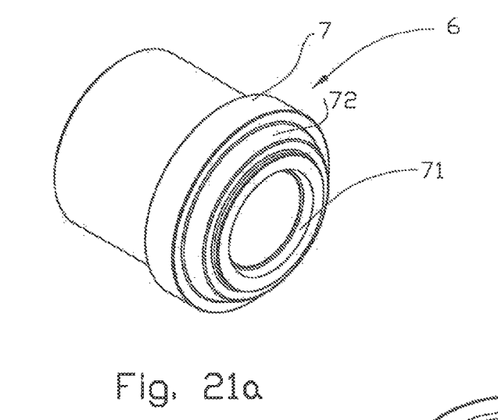
FIG. 21a shows a perspective view of a pipe with an end portion.
Figure 21B:
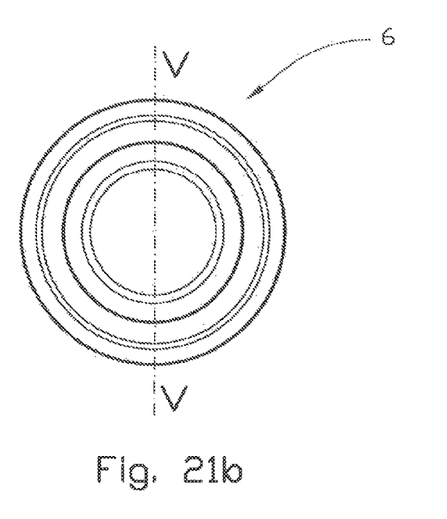
Figure 21C:
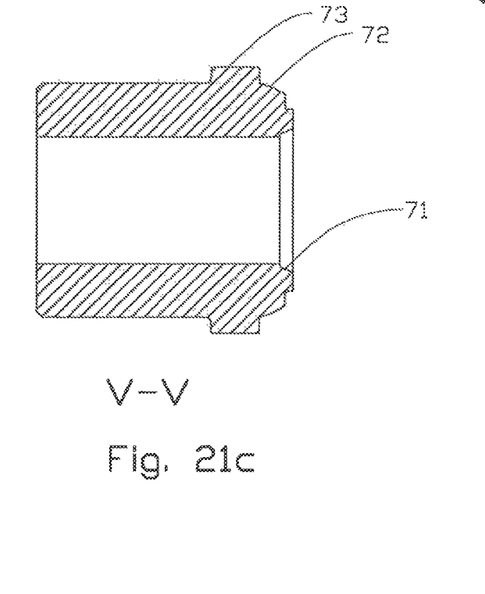
FIG. 21c shows the section V-V of FIG. 21b.
Figure 22:
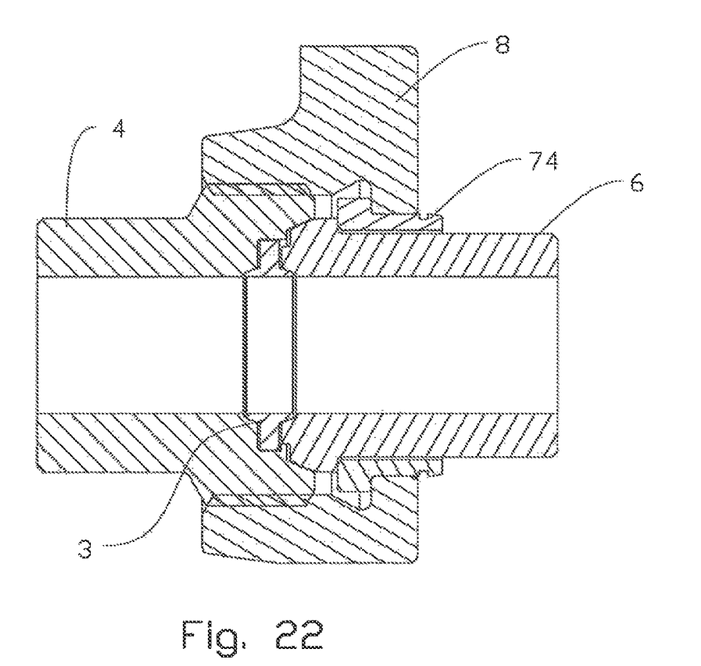
FIG. 22 shows a side view of a hammer union.

FIGS. 21a, 21b and 21c show another exemplary embodiment of an end portion 7 seen in perspective, in an end view and in the section V-V, respectively. The end portion 7 is different from the end portion 7 of FIGS. 20a-20c in that it is provided with a collar 73. The end portion 7 may thus be connected directly to the hammer nut 8 as shown in FIG. 18b. The end portion 7 as it is shown, without a collar 73, in FIGS. 20a-20c is used together with an attached segment 74, as is shown in FIG. 22.

Figure 23:
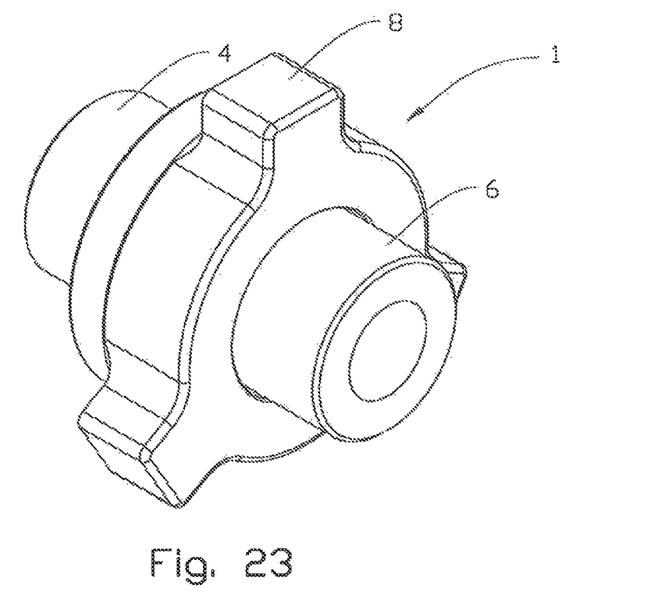
FIG. 23 shows a perspective view of a hammer union.

FIG. 23 shows the hammer union 1 fully assembled with the hammer nut 8 and the two pipes 4, 6.

The following items are described as well:

Item 1 A seal assembly 2 for a hammer union 1, the seal assembly 2 comprising:
a metal gasket 3; and
a pipe 4 comprising a receiving portion 5 arranged to receive the metal gasket 3 internally in the pipe 4;
the metal gasket 3 being fully housed internally in the receiving portion 5, for the metal gasket 3 to be protected from blows against the receiving portion 5.

Item 2 The seal assembly 2 according to item 1, wherein the receiving portion 5 comprises an inner sloping sealing surface 52 for sealing against the metal gasket 3.

Item 3 The seal assembly 2 according to any one of items 1-2, wherein the metal gasket 3 comprises a first sloping sealing surface 32 and a second sloping sealing surface 33.

Item 4 The seal assembly 2 according to item 3, wherein the first sloping sealing surface 32 of the metal gasket 3 is arranged to rest against the inner sloping sealing surface 52 of the receiving portion 5.

Item 5 The seal assembly 2 according to any one of the preceding items, wherein the seal assembly 2 comprises a second pipe 6 with an end portion 7.

Item 6 The seal assembly 2 according to item 5, wherein the end portion 7 of the second pipe 6 comprises an internal sloping sealing surface 71 for cooperation with the second sloping sealing surface 33 of the metal gasket 3.

Item 7 The seal assembly 2 according to any one of items 1-6, wherein the receiving portion 5 has an inner diameter $d_p$ and wherein the metal gasket 3 has an inner diameter $d_g$, the inner diameter $d_p$ of the receiving portion 5 being the same as the inner diameter $d_g$ of the metal gasket 3.

Item 8 A receiving portion 5 for use in a seal assembly 2 according to any one of the preceding items.

Item 9 A metal gasket 3 for use in a seal assembly 2 according to any one of items 1-7.

Item 10 A hammer union 1 that comprises a seal assembly according to any one of items 1-7.

Further, these items are described:

Item 11 A seal assembly 2 for a hammer union 1, the seal assembly 2 comprising:
a metal gasket 3; and
a pipe 4 comprising a receiving portion 5 arranged to receive the metal gasket 3 internally in the pipe 4;
the receiving portion 5 having an inner diameter $d_p$ and the metal gasket 3 having an inner diameter $d_g$, the inner diameter $d_p$ of the receiving portion 5 being the same as the inner diameter $d_g$ of the metal gasket 3.

Item 12 The seal assembly 2 according to item 11, the seal assembly 2 further comprising a second pipe 6.

Item 13 A receiving portion 5 for use in a seal assembly 2 according to any one of items 11-12.

Item 14 A metal gasket 3 for use in a seal assembly 2 according to any one of items 11-12.

Item 15 A hammer union 1 comprising a seal assembly 2 according to any one of items 11-12.

Further, these items are described:

Item 16 A metal gasket 3 for a hammer union 1, the metal gasket 3 being, in the position of application, between the first sealing surface 52 of a first union part 4 and the sealing surface 71 of a second union part 6, the metal gasket 3 being provided with at least one first locking portion 31 which, on rotation of the metal gasket 3 about its own longitudinal axis 20, is arranged to engage with at least one complementarily fitting second locking portion 53, 54 in one of the union parts 4, 6.

Item 17 The metal gasket 3 in accordance with item 16, wherein the first locking portion 31 consists of a divided bulb 31 projecting radially from the outside of the metal gasket 3.

Item 18 The metal gasket 3 in accordance with item 17, wherein the bulb 31 extends over a sector 18 of the circumference of the metal gasket 3.

Item 19 The metal gasket 3 in accordance with item 17, wherein the external radius 28 of the bulb 31 is non-uniform.

Item 20 The metal gasket 3 in accordance with item 19, wherein the bulb 31 has an oval shape.

Item 21 The metal gasket 3 in accordance with item 16, wherein the first union part 4 is a female part and the second union part 6 is a male part.

Item 22 The metal gasket 3 in accordance with item 16, wherein the metal gasket 3 is connected to the first union part 4.

Item 23 The metal gasket 3 in accordance with item 16, wherein the first locking portion 31 is in the first union part 4 or in the second union part 6 and wherein the second locking portion 53, 54 is in the gasket 3.

It should be noted that all the above-mentioned embodiments illustrate the invention, but do not limit it, and persons skilled in the art may construct many alternative embodiments without departing from the scope of the dependent claims. In the claims, reference numerals in brackets shall not be considered to be restrictive. The use of the verb "to comprise" in its various forms does not exclude the presence of elements or steps that are not mentioned in the claims. The indefinite article "a" or "an" in front of an element does not exclude the presence of more such elements.

The fact that some features are specified in dependent claims that are different from each other does not indicate that a combination of these features cannot be used with advantage.

The invention claimed is:

1. A seal assembly for a hammer union, the seal assembly comprising:
   a metal gasket comprising a flange projecting radially, the flange being provided between a first sloping sealing surface and a second sloping sealing surface; and
   a pipe comprising a receiving portion arranged to receive the metal gasket internally in the pipe, the receiving portion comprising a mouth portion and an inner sloping sealing surface for cooperation with the first sloping sealing surface of the metal gasket;
   the receiving portion and the metal gasket being shaped such that a relative rotation between the metal gasket and the pipe results in the metal gasket engaging with the receiving portion, thereby ensuring that the metal gasket is held in the receiving portion independently of the orientation of the pipe.

2. The seal assembly according to claim 1, wherein the flange has a non-circular shape.

3. The seal assembly according to claim 1, wherein the flange has an outer circumferential surface that comprises a first peripheral portion and a second peripheral portion.

4. The seal assembly according to claim 3, wherein a smallest radius of the first peripheral portion is smaller than a largest radius of the second peripheral portion.

5. The seal assembly according to claim 3, wherein the first peripheral portion comprises a recess in the flange.

6. The seal assembly according to claim 5, wherein the first peripheral portion comprises three recesses in the flange.

7. The seal assembly according to claim 3, wherein the second peripheral portion comprises a protrusion in the flange.

8. The seal assembly according to claim 7, wherein the second peripheral portion comprises three protrusions in the flange.

9. The seal assembly according to claim 1, wherein the metal gasket is fully housed internally in the receiving portion, for the metal gasket to be protected from blows against the receiving portion.

10. The seal assembly according to claim 1, wherein the receiving portion further comprises a circular recess for receiving the flange of the metal gasket between the mouth portion and the inner sloping sealing surface of the receiving portion.

11. The seal assembly according to claim 10, wherein a lip projecting inwards in the receiving portion is provided between the mouth portion and the circular recess.

12. The seal assembly according to claim 11, wherein the inward-projecting lip is of such a shape that the flange of the metal gasket may, in at least one position, be moved past the lip.

13. The seal assembly according to claim 1, wherein the receiving portion has an inner diameter ($d_p$) and wherein the metal gasket has an inner diameter ($d_g$), the inner diameter ($d_p$) of the receiving portion being the same as the inner diameter ($d_g$) of the metal gasket.

14. The seal assembly according to claim 1, wherein the receiving portion is one of a male part or a female part.

15. The seal assembly according to claim 1, wherein the seal assembly further comprises a second pipe.

16. The seal assembly according to claim 15, wherein the second pipe comprises an end portion for cooperation with the receiving portion of the pipe.

17. The seal assembly according to claim 16, wherein the end portion further comprises an external sloping sealing surface for cooperation with an outer sloping sealing surface of the receiving portion.

18. A seal assembly for a hammer union, the seal assembly comprising:
   a metal gasket; and
   a pipe comprising a receiving portion arranged to receive the metal gasket internally in the pipe;
   the receiving portion and the metal gasket being shaped such that a relative rotation between the metal gasket and the pipe results in the metal gasket engaging with the receiving portion, thereby ensuring that the metal gasket is held in the receiving portion independently of the orientation of the pipe;
   wherein the metal gasket comprises a flange projecting radially; and
   wherein the flange is oval.

19. A seal assembly for a hammer union, the seal assembly comprising:
   a metal gasket; and
   a pipe comprising a receiving portion arranged to receive the metal gasket internally in the pipe;
   the receiving portion and the metal gasket being shaped such that a relative rotation between the metal gasket and the pipe results in the metal gasket engaging with the receiving portion, thereby ensuring that the metal gasket is held in the receiving portion independently of the orientation of the pipe;
   wherein the seal assembly further comprises a second pipe;
   wherein the second pipe comprises an end portion for cooperation with the receiving portion of the pipe; and
   wherein the end portion comprises an internal sloping sealing surface for cooperation with the second sloping sealing surface of the metal gasket.

20. A seal assembly for a hammer union, the seal assembly comprising:
   a metal gasket; and
   a pipe comprising a receiving portion arranged to receive the metal gasket internally in the pipe;
   the receiving portion and the metal gasket being shaped such that a relative rotation between the metal gasket and the pipe results in the metal gasket engaging with the receiving portion, thereby ensuring that the metal gasket is held in the receiving portion independently of the orientation of the pipe;
   wherein the receiving portion further comprises an outer sloping sealing surface.

21. A hammer union comprising a seal assembly for the hammer union, the seal assembly comprising:
   a metal gasket comprising a flange projecting radially, the flange being provided between a first sloping sealing surface and a second sloping sealing surface; and
   a pipe comprising a receiving portion arranged to receive the metal gasket internally in the pipe, the receiving portion comprising a mouth portion and an inner sloping sealing surface for cooperation with the first sloping sealing surface of the metal gasket;
   the receiving portion and the metal gasket being shaped such that a relative rotation between the metal gasket and the pipe results in the metal gasket engaging with the receiving portion, thereby ensuring that the metal gasket is held in the receiving portion independently of the orientation of the pipe.

22. A hammer union comprising a seal assembly for the hammer union, the seal assembly comprising:

a metal gasket; and a pipe comprising a receiving portion arranged to receive the metal gasket internally in the pipe;

the receiving portion and the metal gasket being shaped such that a relative rotation between the metal gasket and the pipe results in the metal gasket engaging with the receiving portion, thereby ensuring that the metal gasket is held in the receiving portion independently of the orientation of the pipe;

wherein the hammer union further comprises a hammer nut.

* * * * *